(12) United States Patent
Casiraghi et al.

(10) Patent No.: US 12,528,889 B2
(45) Date of Patent: Jan. 20, 2026

(54) COMBINATION OF PHOTOINITIATORS AND USES THEREOF

(71) Applicant: IGM RESINS ITALIA S.R.L., Milan (IT)

(72) Inventors: Angelo Casiraghi, Milano MI (IT); Gabriele Norcini, Comabbio (IT); Stephen Postle, Bradenton, FL (US)

(73) Assignee: IGM RESINS ITALIA S.R.L., Milan (IT)

( * ) Notice: Subject to any disclaimer, the term of this patent is extended or adjusted under 35 U.S.C. 154(b) by 913 days.

(21) Appl. No.: 17/764,714

(22) PCT Filed: Oct. 9, 2020

(86) PCT No.: PCT/IB2020/059500
§ 371 (c)(1),
(2) Date: Mar. 29, 2022

(87) PCT Pub. No.: WO2021/070131
PCT Pub. Date: Apr. 15, 2021

(65) Prior Publication Data
US 2022/0340691 A1  Oct. 27, 2022

(30) Foreign Application Priority Data
Oct. 10, 2019 (IT) .................. 102019000018374

(51) Int. Cl.
*C08F 2/50* (2006.01)
*C08K 5/1545* (2006.01)
*C08K 5/5397* (2006.01)
*C09D 11/101* (2014.01)

(52) U.S. Cl.
CPC .............. *C08F 2/50* (2013.01); *C08K 5/1545* (2013.01); *C08K 5/5397* (2013.01); *C09D 11/101* (2013.01)

(58) Field of Classification Search
None
See application file for complete search history.

(56) References Cited

U.S. PATENT DOCUMENTS

| | | | | |
|---|---|---|---|---|
| 4,849,320 A * | 7/1989 | Irving | ............. | G03F 7/2022 430/394 |
| 4,857,437 A * | 8/1989 | Banks | ............. | G03F 7/0955 430/394 |
| 5,660,968 A * | 8/1997 | Wilczak | ............. | G03F 3/102 430/920 |
| 5,707,781 A * | 1/1998 | Wilczak | ............. | C08F 4/32 430/933 |
| 6,545,064 B1 * | 4/2003 | Bilodeau | ............. | C09D 4/06 522/18 |
| 8,394,869 B2 * | 3/2013 | Akizumi | ............. | C08F 222/1025 522/63 |
| 9,951,034 B2 * | 4/2018 | Morone | ............. | C07D 311/16 |
| 10,513,624 B2 * | 12/2019 | Toeda | ............. | C09D 11/101 |
| 11,597,735 B2 * | 3/2023 | Stansbury | ............. | C08F 2/50 |
| 11,851,590 B2 * | 12/2023 | Yamamoto | ............. | C09J 151/003 |
| 11,898,066 B2 * | 2/2024 | Fujiwara | ............. | C09J 175/16 |
| 11,981,650 B2 * | 5/2024 | Morone | ............. | C09D 11/03 |
| 2004/0186195 A1 * | 9/2004 | Suzuki | ............. | A61K 6/887 522/31 |
| 2008/0076043 A1 * | 3/2008 | Mori | ............. | G03F 7/031 522/74 |
| 2015/0126637 A1 * | 5/2015 | Shukla | ............. | C08F 2/50 252/182.14 |
| 2019/0211222 A1 | 7/2019 | Toeda | | |

FOREIGN PATENT DOCUMENTS

| | | | |
|---|---|---|---|
| CN | 109 957 282 | | 7/2019 |
| JP | 2004 043427 | | 2/2004 |
| JP | 2004043427 A | * | 2/2004 |
| JP | 2005 248137 | | 9/2005 |
| JP | 2015 131927 | | 7/2015 |
| WO | 2005035670 | | 4/2005 |

OTHER PUBLICATIONS

International Search Report issued by the EPO on Dec. 23, 2020 for International patent application No. PCT/IB2020/059500.
Daryl W. Yee et al: "Additive Manufacturing of 3D-Architected Multifunctional Metal Oxides", Advanced Materials, vol. 31, No. 33, Jun. 24, 2019 (Jun. 24, 2019) , p. 1901345, XP055759376, ISSN: 0935-9648, DOI: 10.1002/adma.201901345 Experimental Section; p. 1901345.
Ciba Specialty Chemicals: "Ciba DAROCUR 1173" Ciba Brochure Sep. 4, 2001 (Sep. 4, 2001), pp. 1-3, XP055467933, p. 1.
Liska et al. "Progress in Organic Chemistry" 77, (2014), 1789-1798, Institute for Applied Synthetic Chemistry, Vienna University of Technology, Getreidemarkt 9/163, A-1060 Vienna, Austria.
W. Arthur Green "Industrial Photoinitiators" a Technical Guide, CRC Press, 2010 Taylor and Francis Group.

* cited by examiner

*Primary Examiner* — Sanza L. McClendon
(74) *Attorney, Agent, or Firm* — Silvia Salvadori, P.C.; Silvia Salvadori

(57) ABSTRACT

The present invention relates to a homogeneous liquid/fluid combination of photoinitiators with improved formulability, reactivity and surface curing performances, more particularly to novel combinations of acylphosphine oxides and ketocoumarins, optionally further combined with at least one co-initiator.

10 Claims, No Drawings

COMBINATION OF PHOTOINITIATORS AND USES THEREOF

This application is a U.S. national stage of PCT/IB2020/059500 filed on 9 Oct. 2020 which claims priority to and the benefit of Italian Application No. 102019000018374 filed on 10 October 2019, the contents of which are incorporated herein by reference in their entireties.

SUMMARY OF THE INVENTION

The present invention relates to a homogeneous liquid/fluid combination of photoinitiators with improved formulability, reactivity and surface curing performances, more particularly to novel combinations of acylphosphine oxides and ketocoumarins, optionally further combined with at least one co-initiator.

BACKGROUND OF THE INVENTION

Oxygen sensitivity is the main problem during the radical polymerization of acrylates leading to a poor mechanical performance of the cured film and tacky surfaces.

Method for overcoming oxygen inhibition can be divided in different strategies as reported in Progress in Organic Coatings 77, (2014) 1789-1798:

- Inerting coating with gas inert equipment (nitrogen, carbon dioxide). This is a costly solution to the problem.
- To use high light irradiance lamp which produce a higher concentration of radicals. If the primary output of lamp matches with the absorption maximum of photoinitiator the result will be a more rapid curing process. A high consumption of energy is an expensive solution to the problem.
- Surface lamination with liquid or wax additive to inhibit oxygen diffusion. The extra products could alter the surface coating.
- Using a higher concentration of photoinitiators means a larger radicals concentration when the light is switched on. These radicals help to consume oxygen quickly.
- Amines in the formulation are involved in a radical chain process that consume oxygen.
- Trivalent phosphites, $(R_3O)_3P$, $(ArO)_3P$, $Ar_3P$ and $R_3P$ (where R is a linear or branched alkyl groups and Ar is an optionally-substituted phenyl groups) dramatically accelerate the rate of curing in air. Unfortunately the effectiveness of trivalent phosphites resets within 24 hours.
- The addition of hydrogen donors to reduce oxygen inhibition. Typical hydrogen donors are thiols, silanes, stannanes, and the like, which transform unreactive peroxyl radicals into a hydroperoxyl and new reactive radicals as reported in Progress in Organic Chemistry 2014. Unfortunately, they have unpleasant odor and/or are not simple to handle.

To overcome the problem of oxygen inhibition a different option was to use a combination of two or more photoinitiators.

The coating industry addressed the problem by mixing a photoinitiator absorbing light at >360 nm [MAPO (mono acylphosphine oxide) or BAPO (bis acylphosphine oxide)] with a lower wavelength photoinitiator (<350 nm) which matches the emission bands of mercury lamp as reported by Liska in Progress in Organic Chemistry 77, (2014), 1789-1798 and in WO2005/035670. This anti-oxygen inhibition strategy which mixed acylphosphine oxides and α-hydroxy ketones works well only with mercury lamps but said mixtures can not cover the near-UV or LED visible emission spectrum.

Lalevée (Macromolecules 2018, 51, 4633-4641) proposed a mixture of 3-hydroxy flavone/N-phenyl glycine operating under 405 nm LED.

The charge transfer complex is very reactive in the radical polymerization of acrylates under air because the radical generating rates were rapid enough to face the oxygen inhibition. Unfortunately, not so rapid as to completely eliminate the starting inhibition time. An improvement was obtained by adding an iodonium salt, but this results in the release of an unpleasant odor and post-cure yellowing.

Moreover, blends of photoinitiators without organic diluent or acrylic monomers as reported by W. A. Green in Industrial photoinitiators [Irgacure™ 1300 (BASF), Esacure™ TZT (IGM Resins B.V.), Esacure™ KIP 100F (IGM Resins B.V.) etc.] are commercially available because they are easy to use. These liquid blends provide a synergistic mixture that brings improvements to surface cure and the multiple photoinitiators blend can be more effective than a high concentration of a single initiator.

Unfortunately, the examples mentioned in the book do not work with visible LED lamps as 395 nm, 400 nm, 405 nm.

Molecular complex compounds comprising acylphosphine oxides and α-hydroxy ketones have been proposed by Ciba Specialty Chemicals in U.S. Pat. No. 5,942,290, to be used as reactive photoinitiators. The crystalline molecular complexes contain very few impurities and they are suitable for very sensitive applications provided that is used Hg lamps.

In addition, a mixture of acylphosphine oxides [MAPO (mono acylphosphine oxide) or BAPO (bis acylphosphine oxide)] and camphorquinone (CQ) was evaluated to determine the possible synergistic effects as reported in Journal Applied Polymer Science vol. 112, 129-132, 2009. The results showed that the rate of polymerization of the mixtures are lower when BAPO is mixed with CQ indicating an antagonist effect.

There is therefore an existing need for novel photoinitiators which absorb energy in a wide range of wavelengths and which are easy to be handled and highly performant.

SUMMARY OF THE INVENTION

The invention provides homogeneous liquid/fluid combinations (herein below also referred to as "blends") of photoinitiators that absorb energy emitted from near-UV or visible LED (LED emitting in the range from about 365 nm to about 420 nm) and which are able to cure a photopolymerizable composition when combined with at least one ethylenically unsaturated compound capable of being polymerized by a radical. A homogeneous liquid/fluid combination according to the invention is typically a clear mixture without the presence of solid particles and/or droplets that could separate, at ambient temperature and pressure.

DETAILED DESCRIPTION OF THE INVENTION

According to a preferred embodiment, the invention provides a combination of photoinitiators comprising:
a. at least one liquid or solid photoinitiator belonging to the Norrish Type I photoinitiators group which is at least one acylphosphine oxide;

b. at least one photoinitiator belonging to the Norrish Type II photoinitiators group which is at least one ketocoumarin; and c. optionally, one or more co-initiators.

According to a preferred embodiment, said optionally, one or more co-initiators (c) is present.

According to a preferred embodiment, the invention provides a combination of photoinitiators comprising a' 60 to 90%, preferably 70 to 85% by weight, of at least one Norrish Type I photoinitiators selected from acylphosphine oxides;

b' 1 to 20%, preferably 5 to 20% by weight of at least one, preferably one, Norrish Type II photoinitiator selected from ketocoumarins;

c' 0 to 20%, preferably 5 to 20% by weight of at least one, preferably one, co-initiator.

According to a preferred embodiment, said at least one liquid or solid photoinitiator belonging to the Norrish Type I photoinitiators group (a) or (a') is an acylphosphine oxide.

According to a preferred embodiment, said at least one photoinitiator belonging to the Norrish Type II photoinitiators group (b) or (b') is one ketocoumarin.

According to a preferred embodiment, the invention provides a combination of photoinitiators comprising:

a". 0 to 30%, preferably 10-30% by weight of a solid photoinitiator belonging to the Norrish Type I photoinitiators group and 50 to 80% by weight of a liquid photoinitiator belonging to the Norrish Type I photoinitiators, said Norrish Type I photoinitiators being preferably selected from acylphosphine oxides;

b". 5 to 20%, preferably 10 to 15% by weight, of at least one photoinitiator belonging to the Norrish Type II photoinitiators group, preferably selected from ketocoumarins; and c". 10 to 20% by weight of at least one co-initiator.

According to another of its aspects, the invention provides a combination of photoinitiators comprising:

0 to 30%, preferably 10-30% by weight of a solid photoinitiator belonging to the Norrish Type I photoinitiators group and 50 to 80% by weight of a liquid photoinitiator belonging to the Norrish Type I photoinitiators;

5 to 20%, preferably 10 to 15% by weight, of at least one photoinitiator belonging to the Norrish Type II photoinitiators group; and 0 to 20%, preferably 10 to 20% by weight of at least one co-initiator.

Unless differently specified, all the percentages are expressed by weight of the component with respect to the total weight of the combination. In case water and or solvents are present, their amounts are not included in the total weight of the combination for the calculation of the above percentages.

The terms "liquid", "fluid" and "solid" are herein referred to the state of the matter at ambient temperature and pressure.

Surprisingly, it has now been found that photoinitiator mixtures of different radical Norrish Types as the ones of the invention lead to a homogeneous stable liquid combination which is liquid/fluid, even in the absence of diluents. The combinations of the invention are easy to handle and show a fast dissolution in the formulations for curing.

Definitions

Liquid combination (or blend). Substance in homogeneous phase, clear and liquid/fluid at ambient temperature, made of a mixture of two or more photoinitiators of different Norrish Types and optionally (and preferably) one or more co-initiators. In addition, the inventive homogeneous liquid combination is liquid/fluid and shows an excellent stability even in the absence of organic diluents or acrylic monomers.

Photointiators. Liquid or solid substances that undergo a photoreaction upon light absorption. The photoinitiators used in this invention are of the radical Norrish Type I and II.

Co-initiators. Liquid or solid substances that promote radical polymerization as a result of interaction with Norrish Type II photoinitiators. Examples of co-initiators are aromatic or aliphatic amines such as tertiary amines or N,N-dialkylaniline derivatives, alcohols, ethers or thiols.

Synergy. Synergy generally refers to a mixture of two or more products that produce an advantage in photoactivity compared with the individual materials used alone (Definition by W. A. Green—Industrial Photoinitators). It is often agreed that synergy can be defined as a combination effect that is greater than the additive effect expected as is described in Frontiers in Pharmacology April 2017, Vol 8, Article 158.

Norrish Type I and Norrish Type II photoinitiators are well known in the art, see for instance W. A Green—Industrial Photoinitiators—CRC Press, K. Dietliker—Photoinitiators for free radical and cationic polymerization—SITA Technology Ltd, N. J. Turro—Modern Molecular Photochemistry.

Percentages: Unless otherwise specified, % are weight %, and are based on the total amount of the compositions/mixtures.

DETAILED DESCRIPTION OF THE INVENTION

According to a preferred embodiment, said at least one liquid or solid acylphosphine oxide of the Norrish Type I photoinitiator (a) is selected from the following formulas (I) to (IV):

Formula (I)

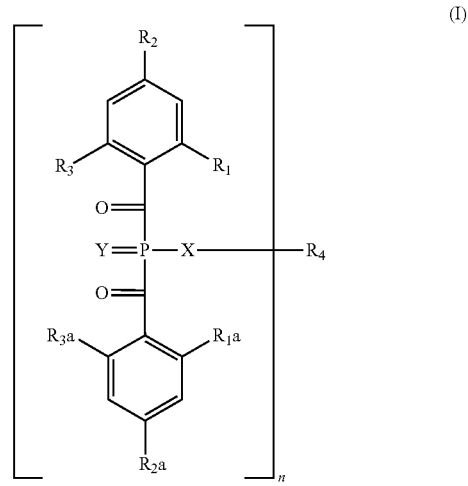

(I)

wherein $R_1$, $R_2$, $R_3$, $R_{1a}$, $R_{2a}$ and $R_{3a}$ independently of each other are C1-C4alkyl, C1-C4alkoxy or halogen;

X is a direct single bond and $R_4$ is C1-C28 alkyl, substituted C1-C28alkyl or C1-C28 alkoxy; or X is O, NR$_5$, S or a direct single bond;

Y is O or S;

n is 1;

R$_4$, is hydrogen, (CO)R$_6$, (CO)OR$_6$, (CO)NR$_5$R$_6$, (SO$_2$)—R$_6$, [Si(R$_7$)(R$_8$)]o-Si(R$_7$)(R$_8$)(R$_9$), [Si(R$_7$)(R$_8$)—O]$_o$—Si(R$_7$)(R$_8$)(R$_9$), C1-C28alkyl, C2-C28alkyl which is interrupted by one or more O, NR$_5$, S, (CO), (CO)O, or SO$_2$; wherein said C1-C28alkyl or interrupted C2-C28alkyl is unsubstituted or substituted by one or more substituents selected from the group consisting of OH, C6-C14aryl, [Si(R$_7$)(R$_8$)]$_o$—Si(R$_7$)(R$_8$)(R$_9$), [Si(R$_7$)(R$_8$)—O]$_o$—Si(R$_7$)(R$_8$)(R$_9$), N(R$_8$)$_2$,

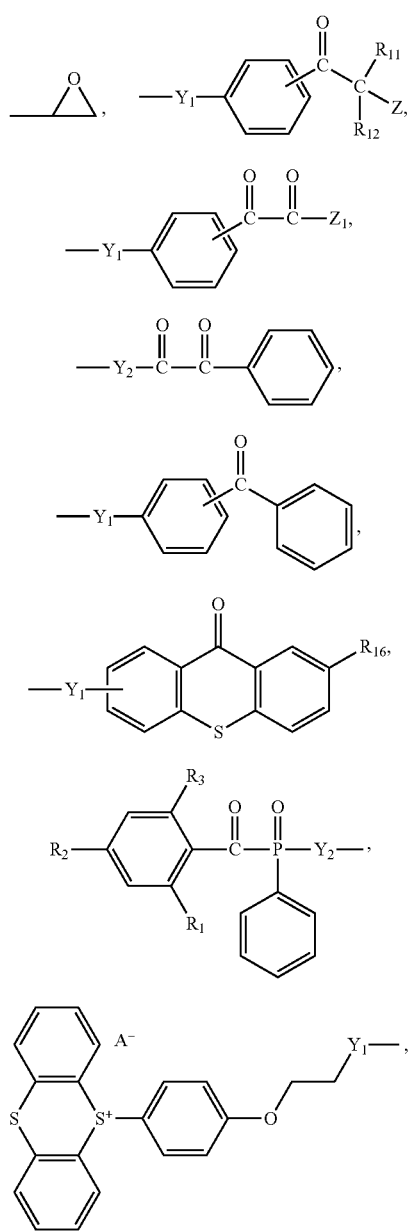

propenoyloxy, 2-methylpropenoyloxy, C3-C12cycloalkyl which is unsubstituted or substituted by C1-C4-alkyl, C1-C4alkoxy or by OH, C3-C12cycloalkyl which is interrupted by one or more O, NR$_5$ or S and which interrupted C3-C12cycloalkyl is unsubstituted or substituted by C1-C4alkyl, C1-C4-alkoxy or by OH, and C6-C14aryl which is unsubstituted or substituted by C1-C4alkyl, C1-C4alkoxy or by OH; or R$_4$, is C6-C10aryl which is unsubstituted or substituted by one or more C1-C12alkyl, C2-C20alkyl which is interrupted by one or more O, C1-C12-alkoxy or by OH; or R$_4$ if X is NR$_5$, together with R$_5$ and the N-atom forms a 5 or 6-membered saturated ring which is uninterrupted or interrupted by O or NR$_5$ and which uninterrupted or interrupted ring is unsubstituted or substituted by one or more C1-C4alkyl, C1-C4alkoxy or by OH;

A is PF$_6$, SbF$_6$, AsF$_6$ or B(C$_6$F$_5$)$_4$;

R$_5$ is hydrogen, (CO)R$_6$, phenyl, C1-C12alkyl, C2-C12alkyl which is interrupted by one or more O, wherein said C1-C12alkyl or interrupted C2-C12alkyl is unsubstituted or substituted by one or more C3-C7cycloalkyl, OH or by NCO, C3-C12cycloalkyl which is unsubstituted or substituted by one or more C1-C4alkyl, C1-C4alkoxy, OH or by NCO;

R$_6$ is C1-C12alkyl, C2-C12alkyl which is interrupted by one or more O, wherein said C1-C12alkyl or interrupted C2-C12alkyl is unsubstituted or substituted by one or more C3-C7-cycloalkyl, OH, NCO or by phenyl which is substituted by NCO;

or R$_6$ is C3-C12cycloalkyl, C2-C10alkenyl which is unsubstituted or substituted by one or more C1-C4alkyl, OH or C1-C4alkoxy;

or R$_6$ is C6-C14aryl which is unsubstituted or substituted by C1-C12alkyl, C1-C12alkoxy, NCO or by NCO-substituted C1-C12alkyl;

or R$_5$ and R$_6$ together with the N-atom form a 5 or 6-membered saturated ring which is uninterrupted or interrupted by O or NR$_5$ and which uninterrupted or interrupted ring is unsubstituted or substituted by one or more C1-C4alkyl, C1-C4alkoxy or by OH;

R$_7$, R$_8$ and R$_9$ independently of each other are C1-C4alkyl, C6-C14aryl or C1-C4alkoxy;

is 0-10;

Y$_1$ is a direct single bond, O, S, NR$_5$, O(CO)—* or O(CO)—CH$_2$—O—*, wherein the asterisk denotes the bond to the phenyl ring of the group (A), (B), (D), or (E);

Y$_2$ is a direct single bond, O, S or NR$_5$;

R$_{11}$ and R$_{12}$ independently of each other are C1-C10alkyl, C2-C10alkenyl or phenyl-C1-C4-alkyl which is unsubstituted or substituted by C1-C4alkyl, or R11 and R12 together with the C-atom to which they are attached are cyclohexyl or cyclopentyl;

Z is OH or NR$_{13}$R$_{14}$;

Z$_1$ is C1-C12alkoxy or C2-C12alkoxy which is interrupted by one or more O, wherein said C1-C12alkoxy or interrupted C2-C12alkoxy is unsubstituted or substituted by OH;

R$_{13}$ and R$_{14}$ independently of each other are C1-C12alkyl, C1-C12alkyl which is substituted by one or more OH or halogen; or R$_{13}$ and R$_{14}$ together with the N-atom to which they are attached form a 5- or 6-membered unsaturated or saturated ring, which ring is uninterrupted or interrupted by O or NR$_{15}$;

$R_{15}$ is C1-C4alkyl;
$R_{16}$ is hydrogen or C1-C4alkyl;
provided that
(i) if $R_1$, $R_2$ and $R_3$ as C1-C4alkyl are $CH_3$ and X is O, then $R_4$ as C1-C28alkyl is not methyl, ethyl, n-propyl, 2-propyl, n-butyl, 1-methyl-prop-1-yl, utyl, n-hexyl;
(ii) if $R_1$ and $R_3$ as halogen are Cl, $R_2$ is hydrogen and X is O, then $R_4$ as substituted C3-C10aryl is not 4-butyl-phenyl;
(iii) if $R_1$ and $R_3$ as C1-C4alkoxy are methoxy, $R_2$ is hydrogen and X is $NR_5$, and $R_4$ together with $R_5$ and the N-atom forms a 5 or 6-membered saturated ring, then said ring is not piperid-1-yl;
such as disclosed in US2016/0039851;

Formula (II)

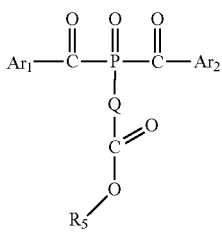

(II)

Wherein $Ar_1$ and $Ar_2$ independently of each other are

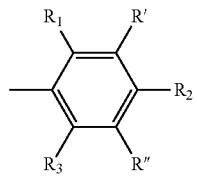

or naphthyl
which is unsubstituted or substituted one or more times by $R_1$, $R_2$, $R_3$ or R';
$R_1$ and $R_3$ independently of each other are C1-C4alkyl, C1-C4alkoxy or halogen; $R_2$ is hydrogen, C1-C4alkyl, halogen, C1-C4alkoxy or C2-C20alkoxy which is interrupted by one or more O;
Q is C1-C4alkylene;
$R_4$ is methyl or ethyl;
R' and R" independently of each other are hydrogen or PG-Y-R'"-X-;
PG is a polymerizable group or methyl or ethyl;
Y is a direct single bond, O or S;
X is a direct single bond, O or S; R'" is a direct single bond, C1-C20alkylene or C2-C20alkylene which is interrupted by one or more O;
$R_5$ is C3-C30alkyl which is unsubstituted or substituted by one or more of the groups selected from OH and

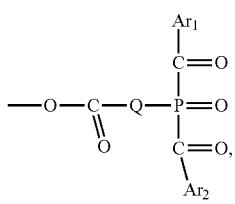

or $R_5$ is C2-C28alkyl which is interrupted by one or more O or C3-C8cycloalkylene and which interrupted C3-C28alkyl is unsubstituted or substituted by one or more of the groups selected from OH and

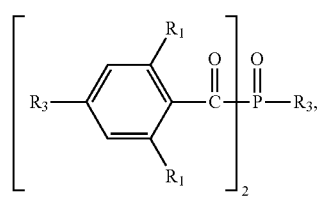

and
optionally a compound of formula $R_5$—OH, wherein $R_5$ is as defined above, such as disclosed in WO2015/004566;

Formula (III)

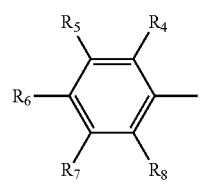

(III)

wherein $R_1$ is C1-C4alkyl, C1-C4alkoxy or halogen;
$R_2$ is hydrogen, C1-C4alkyl, C1-C4alkoxy or halogen and
$R_3$ is C1-C20alkyl, cyclopentyl, cyclohexyl, phenyl-C1-C4alkyl or a group of the following formula

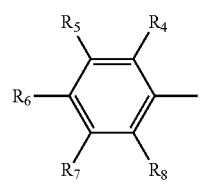

or $R_3$ is naphthyl, biphenylyl or an O—, S- or N-containing 5- or 6-membered heterocyclic ring, the naphthyl, biphenylyl and O—, S- or N-containing 5- or 6-membered heterocyclic ring radicals being unsubstituted or substituted by C1-C4alkyl, C1-C4alkoxy, halogen, C1-C4alkylthio;
$R_4$, $R_5$, $R_6$, $R_7$ and $R_8$ are each independently of the others hydrogen, halogen, C1-C20alkyl, cyclopentyl, cyclohexyl, C2-C12alkenyl, C2-C20alkyl interrupted by one or more non-consecutive O atoms, phenyl-C1-C4alkyl, C1-C20alkoxy, or phenyl that is unsubstituted or substituted by one or two C1-C4alkyl or/and C1-C4alkoxy substituents; such as disclosed in U.S. Pat. No. 6,251,963; and Formula (IV)

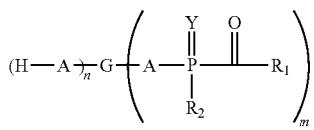

(IV)

wherein:
each A represents independently of one another O, S, NR$_3$;
G is a residue of the multifunctional compound (core) G-(A-H)$_{m+n}$, wherein each A-H represents an alcoholic or amino or thiol group;
m and n are both integer numbers and m+n is comprised between 3 and 10;
m is comprised between 3 and 8;
R$_1$, R$_2$ are independently of one another, a radical selected from C1-C18 alkyl, C6-C12 aryl and C5-C12 cycloalkyl, each of which is uninterrupted or interrupted by one or more oxygen and/or sulfur atoms and/or one or more substituted or unsubstituted imino groups, or are a five- to six-membered heterocyclic radical containing oxygen and/or nitrogen and/or sulfur atoms; where each of said radicals may be substituted by aryl, alkyl, aryloxy, alkoxy, heteroatoms and/or heterocyclic radicals;
R$_2$ may also be R$_1$—(C=O)—;
Y is O or S;
R$_3$ is hydrogen or C1-C4 alkyl;
with the proviso that the photoinitiators of formula (IV) do not contain photocurable ethylenically unsaturated groups; such as disclosed in US2017/0240659.

The expression "multifunctional compound" (or core) is a branched polyethoxylated chain with a molecular weight not greater than 1500 Da and most preferably not greater than 500 Da. The core is preferably chosen among glycerol, ethoxylated/propoxylated glycerol, di-glycerol, ethoxylated/propoxylated di-glycerol, trimethylol propane, ethoxylated/propoxylated trimethylol propane, penthaerythritol and ethoxylated/propoxylated penthaerythritol.

The acylphosphine oxide Norrish Type I photoinitiator is preferably selected from the group consisting of bis-(2,4,6-trimethylbenzoyl) phenylphosphine oxide (presently marketed as Omnirad® 819); bis-(2,6-dimethoxybenzoyl) 2,4,4-trimethylphosphine oxide (presently marketed as Omnirad® 403); diphenyl-(2,4,6-trimethylbenzoyl) phosphine oxide (presently marketed as Omnirad® TPO); ethyl (2,4,6-trimethylbenzoyl) phenylphosphinate (presently marketed as Omnirad® TPO-L); polymeric TPO-L (presently marketed as Omnipol® TP); 2,5,8,11-tetraoxatridecan-13-yl-bis(2,4,6-trimethylbenzoyl)phosphinate (and analogues thereof bearing 3 or 5 ethoxy groups on the side chain and mixtures thereof); butyl bis(2,4,6-trimethylbenzoyl)phosphinate; and also those disclosed in WO2015/004566 and US2016/039851 and mixture thereof.

According to a preferred embodiment, said at least one Norrish Type II ketocoumarins photoinitiator (b) is selected from the following formulas (V) to (VII):

Formula (V)

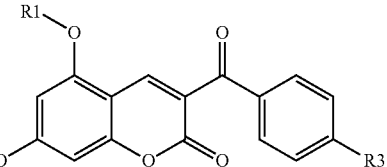

(V)

wherein
R$_1$ and R$_2$ are, each independently, a C1-C4alkyl group
R$_3$ is selected from:
a branched C6-C20alkyl group or a mixture of linear and branched C6-C20alkyl groups;
a C6-C20alkyl-aryl, an aryl C6-C20alkyl, a C6-C20alkyl-heteroaryl, a heteroaryl-C6-C20alkylene oxide, a —COO—C6-C20alkyl and a COOaryl;

Formula (VI)

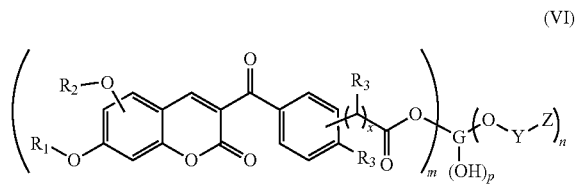

(VI)

G is a residue of an optionally alkoxylated polyhydroxy compound;
m, n and p are numbers and m+n+p has a value ranging from 2 to 10;
p has a value ranging from 0 to 8;
x is an integer number with a value ranging from 0 to 10, and when x is 0, the phenyl group is directly linked to the carbonyl group;
Y represents, each independently a direct single bond or a substituted or unsubstituted divalent linking group comprising 1 to 14 carbon atoms;
Z represents a radically polymerizable functional group;
R$_3$ represents, each independently hydrogen, alkyl C1-C12, substituted or unsubstituted phenyl, aryl or heteroaryl, cycloalkyl C5-C6, alkyl C1-C12 which is substituted with —SH, —N(alkyl C1-C6)$_2$, piperidino, morpholino, piperazino, —OH, —O(alkyl C1-C12), —COOH; or C1-C12 alkoxy; R$_1$ and R$_2$ are, each independently, hydrogen, alkyl C1-C12, substituted or unsubstituted phenyl, substituted or unsubstituted aryl, substituted or unsubstituted heteroaryl, cycloalkyl C5-C6, alkyl C1-C12 which is substituted with —SH, —N(alkyl C1-C6)$_2$, piperidino, morpholino, piperazino, —OH, —O(alkyl C1-C12), COOH; or C1-C12 alkoxy; and Formula (VII)

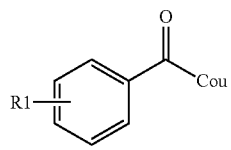

(VII)

$R_1$ is hydrogen or a substituted or unsubstituted C1-C12alkyl group;

Cou is a coumarin group of Formula (a):

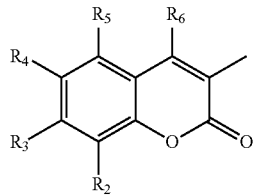

(a)

wherein:

$R_2$, $R_3$, $R_4$ and $R_5$ are, independently of one another, hydrogen; or —S—$R_7$, where $R_7$ is hydrogen, C1-C12alkyl, C2-C12alkenyl, substituted or unsubstituted phenyl, aryl or heteroaryl, C5-C6cycloalkyl, C1-C12alkyl which is substituted with SH, —N(C1-C6 alkyl)$_2$, piperidino, morpholino, piperazino, —OH, —O(C1-C12 alkyl), —COOH; or C1-C12alkoxy; and at least one of $R_2$, $R_3$, $R_4$ and $R_5$ is different from H;

$R_6$ is hydrogen, a hydroxyl group or an alkyl group having from 1 to 4 carbon atoms;

or Cou is a substituted or unsubstituted naphtha-coumarin group of formula:

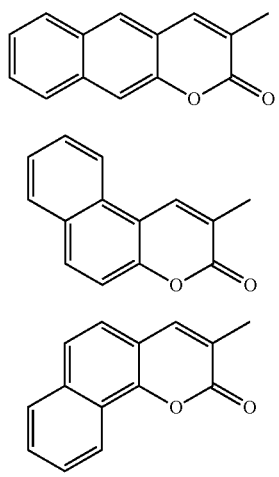

(b)

(c)

(d)

provided that at least one of $R_2$, $R_3$, $R_4$ and $R_5$ is different from H and that, when Cou is (a) and at least one of $R_2$, $R_3$, $R_4$ and $R_5$ is C1-C12 alkoxy or when Cou is (b), (c) or (d), $R_1$ is a substituted or unsubstituted C1-C12 alkyl group;

such as disclosed in WO2014/063997.

Particularly preferred ketocoumarins are selected from 3-(4-dodecylbenzoyl)-5,7-dimethoxy-coumarin (presently marketed as Esacure3644®—WO2017/216699—IGM Resins B.V.) and the other compounds described in said application, or are selected from acrylated ketocoumarins described in WO2019/116176 (IGM Resins Italia) or are selected from ketocoumarins disclosed in WO2014/018826 (Sun Chemical Corporation).

Other preferred coumarins are selected from:

coumarin, coumarin 3-phenyl, coumarin 3-benzoyl, coumarin 3-thenoyl, coumarin 3-carboxylic, coumarin 3-methyl, coumarin 7-hydroxy, coumarin 6-methyl, coumarin 4-hydroxy, coumarin 3-(4-cyanobenzoyl), coumarin 3-(4-methoxybenzoyl), coumarin 3-benzoyl-5,7-dimethoxy, coumarin 3-benzoyl 7-dimethylamino, coumarin 3-(2-benzofuroyl)-7-diethylamino, coumarin 7-(diethylamino)-3-thenoyl, coumarin 3-(4-cyanobenzoyl)-5,7 dimethoxy, coumarin 3-(4-cyanobenzoyl)-7-methoxy, coumarin 5,7-dimethoxy-3-(4-methoxybenzoyl), coumarin 5,7-dimethoxy-3-thenoyl, coumarin 3-benzoyl-7-methoxy, coumarin 7-methoxy-3-(4-methoxybenzoyl), coumarin 3-thenoyl-7-methoxy, coumarin 5,7-dimethoxy, coumarin 7-hydroxy-4-methyl, coumarin 4-methyl-7-dimethylamino, coumarin 4-methyl-7-ethylamino, coumarin 4-methylpiperidino[3,2-g], coumarin 4-methyl-7-cyclohexyl amino, coumarin 4-trifluoromethyl-7-diethylamino, coumarin 3-phenyl-4-methyl-7-diethylamino, coumarin 3-(2'-n-methyl benzimidazoyl)-7-diethylamino, coumarin 4-trifluoromethyl-6-methyl-7-ethylamino, coumarin 3-phenyl-7-amino and the ones disclosed in WO 2014/018826 (Sun Chemical patent). Any combination of at least one compound of Formulas (I) to (IV) with at least one compound of Formulas (V) to (VII) is contemplated in the present invention. Also contemplated in the present invention is any combination of the above mentioned preferred Norrish Type I and Norrish Type II photoinitiators. Particularly preferred are also the combinations disclosed in the Examples which follow.

According to a preferred embodiment, the combination of the invention comprises one or more co-initiator.

Typically, a co-initiator is a molecule that acts as hydrogen donor. Amines, alcohols, thiols are known as co-initiators which also include, but are not limited to, aliphatic, cycloaliphatic, aromatic, aryl-aliphatic, heterocyclic, oligomeric, polymeric, acrylic or methacrylic derivatives.

Examples of suitable co-initiators are bis-N,N-[4-dimethylaminobenzoyl) oxyethylen-1-yl]-methylamine (presently marketed as Esacure® A198), ethyl-4-dimethylamino benzoate (presently marketed as Omnirad® EDB), 2-ethylhexyl-4-dimethylaminobenzoate (presently marketed as Omnirad® EHA), N-phenyl glycine, poly(ethylene glycol) bis(p-dimethylaminobenzoate) (presently marketed as Omnipol® ASA) or acrylate amines as the compounds presently marketed as Photomer® 4250, Photomer® 4771, Photomer® 4775, Photomer® 4780 or the compound disclosed in Example 4 of US2013/0012611.

The above listed compounds are merely examples of the preferred photoinitiators or co-initiators but are in no way intended to limit the invention.

Preferred combinations of the invention comprises:

(a) at least one acylphosphine oxide selected from the following:

phenyl bis-(2,4,6-trimethylbenzoyl)phosphine oxide (Omnirad® 819);

polymeric TPO-L (Omnipol® TP);

2,4,6-trimethylbenzoyldiphenylphosphine oxide (Omnirad® TPO);

(octylphosphoryl) bis-(mesitylmethanone) (herein disclosed as Compound 1); and bis-(2,4,6-trimethylbenzoyl)-phosphinic acid, polyethylenglycol-monomethylether ester (herein disclosed as Compound 2);

(b) at least one ketocoumarin selected from among the following:

Esacure® 3644 (Coumarin 3-((4-dodecyl)benzoyl)-5,7-dimethoxy);

coumarin 3-(benzoyl)-7-ethylsulfide (herein disclosed as Compound 3);

coumarin 3-((4-t-butyl)benzoyl)-7-methoxy (herein disclosed as Compound 4); and

β-naphtho-coumarin 3-((4-t-butyl)benzoyl) (herein disclosed as Compound 5);

(c) at least one co-initiator selected from among the following:

1H-azepine-1-propanoic acid, hexahydro-2,2-bis[[(1-oxo-2-propen-1-yl)oxy]methyl]butyl ester (Photomer® 4250); and 1,1,1-trimethylolpropane tri-(3-[N-methyl-N-phenylamino]propionate).

Particularly preferred combinations are Compound 1 and/or Compound 2 and Esacure® 3644, preferably with Photomer® 4250.

Preferably, the combination of the invention does not comprise any organic diluent or acrylic monomer.

If some of the components of the combination of the invention is solid, the combination may be prepared by a process comprising the following steps:
1) the liquid components of the combination are blended and stirred at ambient temperature;
2) the mixture is heated at 40-80° C., preferably at 60° C.;
3) the solid components of the formulation are added under stirring at 40-80° C., preferably at 60° C., then the mixture is stirred at 100-140° C., preferably at 120° C. for about 1 hour thus obtaining a clear solution;
4) the solution is cooled to ambient temperature obtaining a clear liquid blend.

Alternatively, if the components of the combination are all liquid, the blend can be obtained by simply mixing them at ambient temperature.

The inventive liquid combinations are suitable for fast photopolymerization of photocurable compositions with near-UV or visible LED lamps.

The combinations of photoinitiators of this invention were shown to exploit a synergistic effect between the selected Norrish Type I and II photoinitiators. Indeed, acylphosphines oxides are fast photoinitiators but they are very sensitive to oxygen inhibition. The acylphosphine oxides are known to perform a good through cure thanks to photobleaching but they need to be formulated with an additive to improve the superficial cure.

Normally the skilled in the art uses to add amines as co-initiators because they have beneficial effect on the rate of polymerization. Acylphosphine oxides are usually positively affected but the improvement is not so significant. Surprisingly, a small addition of a Norrish Type II photoinitiator, especially a ketocoumarine, such as the compound presently marketed as Esacure® 3644, absorbing at the range of wavelength of acylphosphine oxide definitely and significantly improves the rate of curing.

According to the invention, the combinations can be used to prepare photocurable compositions comprising ethylenically unsaturated compounds which contain one or more olefinic double bonds.

Said compositions comprise the combinations of the invention and at least one ethylenically unsaturated compound and represent another subject-matter of the invention.

According to a preferred embodiment, the invention relates to a photocurable composition comprising:
i. from 80 to 99% by weight of at least one ethylenically unsaturated compound;
ii. from 1 to 20% by weight of a combination according to the invention.

Unless differently specified, all the percentages are expressed by weight of the component with respect to the total weight of the composition. In case water and or solvents are present, their amounts are not included in the total weight of the composition for the calculation of the above percentages.

Examples of suitable ethylenically unsaturated compounds (e.g. monomers or oligomeric polyunsaturated compounds) having one double bond are alkyl or hydroxyalkyl (meth)acrylates such as methyl, ethyl, butyl, 2-ethylhexyl or 2-hydroxyethyl (meth)acrylates, isobornyl acrylate. Also suitable are resins modified with silicon or fluorine, e.g. silicone acrylates. Further examples of suitable monomers are acrylonitrile, (meth)acrylamide, N-substituted (meth)acrylamides, styrene, alkylstyrenes and halogeno-styrenes, vinyl esters such as vinyl acetate, vinyl ethers such as isobutyl vinyl ether, N-vinyl caprolactam, N-vinylpyrrolidone, N-vinyl carbazole or vinyl chloride.

Further examples of suitable monomers having more than one double bond are the ethylene glycol diacrylate, propylene glycol diacrylate, neopentyl glycol diacrylate, hexamethylene glycol diacrylate, bisphenol A diacrylate, 4,4'-bis-(2-acryloxyethoxy)-diphenyl propane, trimethylolpropane triacrylate, pentaerythritol triacrylate or tetraacrylate, vinyl acrylate, divinyl benzene, divinyl succinate, diallyl phthalate, triallyl phosphate, triallyl isocyanurate or tris-(2-acryloylethyl) isocyanurate.

Suitable examples of oligomeric polyunsaturated compounds are acrylated epoxy resins, acrylated or vinyl-ether or epoxy-group containing polyesters, acrylated polyurethanes or acrylated polyethers.

Examples of compounds (i) which are particularly suitable for the implementation of the present invention are esters of ethylenically unsaturated carboxylic acids and polyols or polyepoxides and polymers containing ethylenically unsaturated groups in the chain or in side groups such as unsaturated polyesters, polyamides and polyurethanes and copolymers thereof, alkyd resins, polybutadiene and butadiene copolymers, polyisoprene and isoprene copolymers, polymers and copolymers having (meth)acrylic groups in side chains, as well as mixtures of one or more than one such polymers.

Illustrative examples of unsaturated carboxylic acids or anhydrides useful for the preparation of said esters, are (meth)acrylic acid, maleic anhydride, crotonic acid, itaconic acid, cinnamic acid and unsaturated fatty acids such as linolenic acid and oleic acid. (Meth)acrylic acid are preferred.

Further suitable ethylenically unsaturated compounds are unsaturated polyamides obtained from unsaturated carboxylic acids and aromatic, aliphatic and cycloaliphatic polyamines having preferably from 2 to 6 amino groups. Examples of such polyamines are: ethylenediamine, 1-2-propylenediamine, 1-3-propylenediamine, 1-2-butylenediamine; 1-3-butylenediamine, 1-4-butylenediamine, 1-5-pentylenediamine, 1-6-hexylenediamine, octylenediamine, dodecylenediamine, 1-4-diaminocyclohexane, isophoronediamine, phenylenediamine, bisphenylenediamine, di-(β-aminoethyl) ether, diethylene triamine, triethylenetetramine and di-(β-aminoethoxy)- and di-(β-aminopropoxy)-ethane. Specific examples of such unsaturated polyamides are: methylenebisacrylamide, 1-6-hexamethylene bisacrylamide, diethylenetriamine trismethacrylamide, bis(methacrylamidopropoxy)ethane and N—[(β-hydroxyethoxy)ethyl]-acrylamide.

Unsaturated polyurethanes are also suitable as ethylenically unsaturated compounds for the implementation of the present invention, for example the aliphatic urethanes diacrylates such as Photomer® 6009 aliphatic urethanes triacrylates such as Photomer® 6008 or Photomer® 6010, the aliphatic urethane hexaacrylate such as Photomer® 6621. Further examples are aromatic urethane diacrylate such as Photomer® 6581 or the aromatic urethane hexacrylate such as Photomer® 6720.

Besides the combinations of the invention and the ethylenically unsaturated compounds, the compositions of the invention may include further components including, but not limited, to binders which are advantageous when the photopolymerizable compounds are liquid or viscous substances. The choice of the binder is made in accordance with the field of use and the properties required. Suitable binders are omo- and co-polymers of acrylates and methacrylates, polyethers such as polyethylene oxide, polyvinyl acetate. Furthermore, additives are, for example, wetting agents which improve the wettability of solids and dispersing agents which prevent particles flocculation such as the BYK's products line.

One of the important components for formulating of inks are artificial or natural fillers which change rheological properties of the ink enhancing the colors consistency. Filler task is to replace a certain percentage of expensive pigments and to have positive influence on the properties of printability of inks. Conventional fillers used in the manufacture of printing inks are: Barium Sulfate, Aluminum hydroxide, Magnesium carbonate, Calcium Carbonate, Talk, Clay, Silica.

Adhesion promoters are used to improve adhesion of UV inks on difficult substrates such as plastics, metals, PVC, polystyrene, aluminum and glass. Example of this type of additives are chelated titanate, Loxanol™ series by BASF or Addox™ series by DOXA.

The ink, coating or adhesive, may also comprise a lubricant to provide improved break-out properties. Example of such lubricants are fluorocarbon oils or resins or functionalized silicone compound.

The skilled in the art is perfectly able to select the appropriate further components of the composition of the invention.

The composition of the invention may comprise one or more photosensitizers.

If one or more photosensitizers are added to the compositions of the invention, they can be present in an amount from 0.05 to 12% by weight, preferably from 0.1 to 10% by weight.

The homogeneous liquid combinations and compositions of the invention can be used in:
printing industry to produce screen printing inks, offset printing inks, flexographic printing inks, gravure printing inks, digital printing inks, white inks etc.;
electronics industry for solder masks, etch resists, insulation layers and the like for printed circuits, protective coatings, encapsulants, displays and other electronic items of manufacture;
optics industry for optical fiber coatings, waveguides and lens;
the production of three-dimensional objects, so called 3-D printing or additive manufacturing;
adhesives.

Examples of sensitizers are those commonly used in the art, aromatic carbonyl compounds, e.g. benzophenones, thioxanthones, anthraquinones and 3-acylcoumarin derivatives, terphenyls, styryl ketones, and 3-(aroylmethylene)-thiazolines, camphorquinones and also eosin, rhodamine and erythrosine dyes.

The inventive combinations and/or compositions are also suitable for inclusion in holographic applications, wood, vinyl, ceramic, metal and plastic coatings.

The above-mentioned uses of the combinations and/or compositions of the invention represent a further subject-matter of the invention.

Another subject-matter of the invention is a method for printing and coating which comprises the combinations and/or compositions of the invention as well as articles of manufacture which are made by the said method.

More particularly, the method of the invention comprises:
coating or printing a photopolymerizable composition according to the invention onto a substrate, and
photopolymerizing said coated or printed composition with a light source on said substrate.

Preferably, the light source is in the near-UV or visible LED.

As it will be shown in the Experimental Part, the addition of even small amounts of Norrish Type II photoinitiators of the invention (ketocoumarins) to Norrish Type I photoinitiators of the invention (acylphosphines) provides an unexpected result in terms of improving overall performance. Indeed, the addition of Norrish II Type photoinitiators (especially ketocoumarins) improves the degree of polymerization and the reactivity of the superficial part of the coating (the one in contact with air) which is the weakness of Norrish Type I photoinitiators (especially acylphosphines) when used alone.

The invention will be disclosed in greater detail in the following Experimental Section in a non-limiting way.

EXPERIMENTAL SECTION

Raw Material Identification

| | | Acylphosphine oxide | | Physical status at r.t. |
|---|---|---|---|---|
| Omnipol ®TP | IGM Resins B.V. WO2015/181332 | Polymeric TPO-L | | liquid |
| Omnirad ® 819 | IGM Resins B.V. U.S. Pat. No. 6,251,963 | Phenyl bis(2,4,6-trimethylbenzoyl) phosphine oxide | | solid |
| Compound 1 | IGM Resins B.V. U.S. Pat. No. 6,251,963 | (octylphosphoryl)bis(mesitylmethan one) | | liquid |

-continued

| | | | Physical status at r.t. |
|---|---|---|---|
| Compound 2 | IGM Resins B.V. US2016/0039851 | bis-(2,4,6-trimethylbenzoyl)-phosphinic acid, polyethylenglycol-monomethylether ester | liquid |

| | Ketocoumarin | | Physical status at r.t. |
|---|---|---|---|
| Esacure® 3644 | IGM Resins B.V. WO2014/063997 | Coumarin 3-(4-dodecylbenzoyl)5,7-dimethoxy | solid |
| Compound 3 | IGM Resins B.V. WO2014/063997 | (Coumarin 3-(benzoyl)-7-ethylsulfide) | solid |
| Compound 4 | IGM Resins B.V. WO2014/063997 | (Coumarin 3-((4-t-butyl)benzoyl)-7-methoxy) | solid |
| Compound 5 | IGM Resins B.V. WO2014/063997 | (β-Naphtho-Coumarin 3-((4-t-butyl)benzoyl)) | solid |

| | Co-initiator | | Physical status at r.t. |
|---|---|---|---|
| Photomer™4250 | IGM Resins B.V. | 1H-Azepine-1-propanoic acid, hexahydro-2,2-bis[[(1-oxo-2-propen-1-yl)oxy]methyl]butyl ester | liquid |
| Compound 6 | Sun Chemical Corporation US2013/012611 | 1,1,1-trimethylolpropane tri-(3-[N-methyl-N-phenylamino]propionate) | liquid |

General Procedure

Into a three necked 250 ml flask at ambient temperature the liquid components are charged; then, after heating at 60° C., are added the solid components.

The clear solution was stirred for 1 hours at 120° C., then the blend was slowly cooled to ambient temperature and discharged.

Compositions and Stability

The compositions of the blends prepared according to the general procedure are reported in Table 1.

TABLE 1

Weight percentage compositions of the blends

| | Acylphosphine oxide | | | | ketocoumarin | Co-initiator |
|---|---|---|---|---|---|---|
| Example | Omnirad® 819 | Omnipol® TP | Compound 1 | Compound 2 | Esacure® 3644 | Photomer® 4250 |
| 1 | 10 | 60 | | | 10 | 20 |
| 2 | 13 | 57 | | | 10 | 20 |
| 3 | 13 | 59 | | | 13 | 15 |
| 4 | 15 | 55 | | | 15 | 15 |
| 5 | 17 | 50 | | | 17 | 16 |
| 6 | 18 | 52 | | | 14 | 16 |
| 7 | 20 | 52 | | | 12 | 16 |
| 8 | 22 | 52 | | | 10 | 16 |
| 9 | 24 | 52 | | | 8 | 16 |
| 10 | 10 | | 60 | | 10 | 12 |
| 11 | | | 72 | | 12 | 16 |
| 12 | | | | 72 | 12 | 16 |

The blends' stability was evaluated at 20° C. and 40° C. protected from light. The stable blends were evaluated for reactivity, surface cure and through cure in pigmented formulation.

Application Results

Example 1

Surface Curing and Through Cure

The test formulations were prepared by dissolving 6% by weight of blend in an industrial cyan offset ink based on a multifunctional acrylate which comprises pentaerythritol [5 EO] tetraacrylate 15-20%; ditrimethylolpropane tetra-acrylate 5-10%, trimethylolpropane [3 EO] triacrylate 5-10%, glyceryl [4 PO] triacrylate 1-2% and 15-18% of cyan pigment (15:3 Phthalo Blue), all the % being by weight. The test formulations were homogenized with a mechanical stirrer for 1 hour at ambient temperature and applied onto a Leneta paper at 1.5 microns of thickness using IGT repro-tester equipment.

The formulations were cured using Phoseon Fire Power 395 nm UV-LED lamp (4 W/cm) at a distance of 5 mm.

For the surface cure the evaluation was carried out considering the number of passages at a speed of 100 m/min to obtain a dry surface (cotton test). Lower is the number of passages, better the surface cure.

In addition, the surface cure was checked by FT-IR spectroscopy measuring the acrylate double bond conversion (DBC) at approx. 1407 $cm^{-1}$.

The through cure test is a measurement of the complete ink cure obtained at a defined speed and checked by "thumb twist pressure test". Higher speed corresponds to higher reactivity.

The results are shown in Table 2:

TABLE 2

Surface cure and through cure of the cyan industrial offset ink cured with LED lamp at 395 nm (4 W/cm) under air.

| Sample - % content of blend in test formulation | Surface cure Pass number at 100 m/min | Through cure (m/min) |
| --- | --- | --- |
| Omnirad ® 819 (reference) (6%) | 3 | 65 |
| Compound 1 (reference) (6%) | 4 | 20 |
| Compound 1 (4.91%) + Photomer ™4250 (1.09%) (reference) | 3 | 35 |
| Esacure ® 3644 (0.72%) + Photomer ™4250 (0.96%) (Reference) | >10 | <10 |
| Example 1 (6%) | 3 | 52 |
| Example 7 (6%) | 3 | 75 |
| Example 11 (6%) | 2 | 96 |
| Example 12 (6%) | 3 | 57 |

These results demonstrate that the inventive liquid blend of Example 11 provides either better through cure performance and improved surface cure in comparison to Omnirad® 819 or specifically in comparison to Compound 1 alone and the mixture Compound 1 and Photomer™ 4250. Also Esacure® 3644 and Photomer®4250, at the same concentration, showed a very low reactivity (see Table 2).

The previous results were confirmed by FT-IR; Example 11 provides an improved surface performance because DBC % was higher than the others coating after 1 pass at 100 m/min as shown in the Table 3.

TABLE 3

DBC % conversion by AT-IR measurements.

| | Total % amount of blend in the ink | DBC % Line speed 100 m/min at 4 W/cm |
| --- | --- | --- |
| Omnirad ® 819 (reference) | 6 | 38.98 |
| Compound 1 (reference) | 6 | 19.63 |
| Compound 1 (4.91%) + Photomer ®4250 (1.09%) | 6 | 30.57 |
| Example 11 | 6 | 44.63 |

Example 2

Synergic Effect of LFC3644 and Other Ketocoumarins with Acylphosphine-Oxides

A LED curable ink is prepared adding 4.32 parts of acylphosphine oxide and 0.72 parts of Esacure™ 3644 to an industrial cyan offset ink and the mixture was stirred for 1 hours at ambient temperature until homogeneity.

The ink was printed onto Leneta paper at 1.5 microns of thickness using IGT repro-tester equipment and cured with a Phoseon Flare Power 395 nm UV-LED lamp (4 W/cm), at distance of 5 mm.

The surface cure and the through cure were checked as disclosed in Example 1. The results are shown in the Table 4.

TABLE 4

Reactivity of Acylphosphine oxides and ketocoumarin Esacure ®3644.

| | | Total % amount of blend in the ink | Surface cure Pass number at 100 m/min | Through cure (m/min) |
| --- | --- | --- | --- | --- |
| Omnirad ® 819 | References | 6 | 3 | 65 |
| Compound 1 | | 6 | 4 | 20 |
| Omnirad ® 819 + Esacure ® 3644 | Experimental mixtures | 5.04 | 2 | 98 |
| Compound 1 + Esacure ® 3644 | | 5.04 | 3 | 68 |

These results show that is possible to have a liquid blend, such as the mixture Compound 1+Esacure® 3644, with good performance either on surface and through cure also in absence of the co-initiator. Other ketocoumarins were tested in the same conditions, with Compound 1 and the results are reported in Table 5.

TABLE 5

Effect of ketocoumarins on Compound 1

| | Total amount of blend in the ink | Surface cure Pass number at 100 m/min | Through cure (m/min) |
| --- | --- | --- | --- |
| Compound 1 | 6 | 4 | 20 |
| Compound 1 + Esacure ® 3644 | 5.04 | 3 | 68 |
| Compound 1 + Compound 4 | 5.04 | 3 | 27 |
| Compound 1 + Compound 3 | 5.04 | 2 | 100 |
| Compound 1 + Compound 5 | 5.04 | 4 | 90 |

These results show that in the presence of ketocoumarins the rate of cure is significantly increased compared to Compound 1 alone. Although the combination Esacure® 3644 did not show the best performance, it provides interesting advantages such as good solubility and excellently low post-cure yellowing.

Example 3

Synergic Effect of Ketocoumarins on Compound 1 in the Presence of the co-initiator Photomer® 4250.

Blends of Compound 1, different ketocoumarins and amine co-initiators were prepared adding 4.32 parts of Compound 1, 0.72 parts of ketocoumarin and 0.96 parts of the co-initiator Photomer™ 4250 to the industrial cyan offset ink. As reference the same formulation without Photomer® 4250 were prepared. The tests were carried out as reported in the previous Examples. Results are shown in the Table 6.

TABLE 6

Synergic effects of Compound 1 blends with ketocoumarins and Photomer ®4250.

| | Total amount of Norrish Type I and Norrish Type II photoinitiators | Surface cure Pass number at 100 m/min | Through cure (m/min) |
|---|---|---|---|
| Compound 1 | 6 | 4 | 20 |
| Compound 1 + Esacure ® 3644 | 5.04 | 3 | 68 |
| Compound 1 + Compound 4 | 5.04 | 3 | 27 |
| Compound 1 + Compound 3 | 5.04 | 2 | 100 (*) |
| Compound 1 + Compound 5 | 5.04 | 4 | 90 |
| Compound 1 + Esacure ® 3644 + Photomer ® 4250 | 5.04 | 2 | 96 |
| Compound 1 + Compound 4 + Photomer ® 4250 | 5.04 | 3 | 77 |
| Compound 1 + Compound 3 + Photomer ® 4250 | 5.04 | 2 | >100 (*) |
| Compound 1 + Compound 5 + Photomer ® 4250 | 5.04 | 4 | 99 |

(*) max speed of the belt.

Results confirm that the presence of the amine co-initiator further improve the performance of the blends respect to the bi-component combinations.

The invention claimed is:

1. A combination of photoinitiators comprising:
   a' 60 to 90% by weight, of at least one Norrish Type I photoinitiator selected from acylphosphine oxides;
   b' 1 to 20% by weight, of at least one, Norrish Type II photoinitiator selected from ketocoumarins; and
   c' 0 to 20% by weight, of at least one co-initiator.

2. The combination of claim 1 comprising,
   a" 0 to 30% by weight, of a solid photoinitiator belonging to Norrish Type I photoinitiators and 50 to 80% by weight of a liquid photoinitiator belonging to Norrish Type I photoinitiators selected from acylphosphine oxides;
   b" 5 to 20% by weight, of at least one photoinitiator belonging to Norrish Type II photoinitiators selected from ketocoumarins; and
   c" 10 to 20% by weight, of at least one co-initiator.

3. The combination of claim 2, wherein said at least one liquid or solid acylphosphine oxide is selected from the following Formulas (I) to (IV):

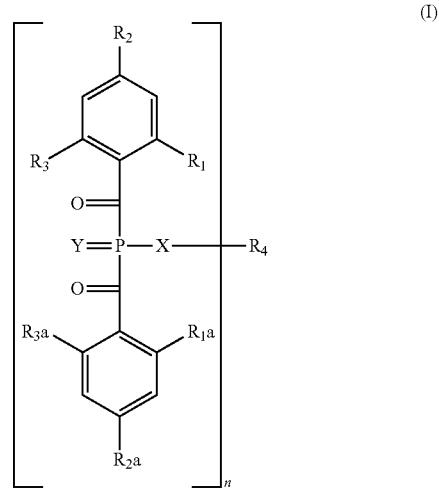

Formula (I)

wherein
$R_1$, $R_2$, $R_3$, $R_{1a}$, $R_{2a}$ and $R_{3a}$ independently of each other are C1-C4alkyl, C1-C4alkoxy or halogen;
X is a direct single bond and $R_4$ is C1-C28alkyl, substituted C1-C28alkyl or C1-C28alkoxy; or
X is O, $NR_5$, S or a direct single bond;
Y is O or S;
n is 1;
$R_4$, is hydrogen, $(CO)R_6$, $(CO)OR_6$, $(CO)NR_5R_6$, $(SO_2)$—$R_6$, $[Si(R_7)(R_8)]_o$—$Si(R_7)(R_8)(R_9)$, $[Si(R_7)(R_8)$—$O]_o$—$Si(R_7)(R_8)(R_9)$, C1-C28alkyl, C2-C28alkyl which is interrupted by one or more O, $NR_5$, S, (CO), (CO)O, or $SO_2$; wherein said C1-C28 alkyl or interrupted C2-C28 alkyl is unsubstituted or substituted by one or more substituents selected from the group consisting of
OH, C6-C14 aryl, $[Si(R_7)(R_8)]_o$—$Si(R_7)(R_8)(R_9)$, $[Si(R_7)(R_8)$—$O]_o$—$Si(R_7)(R_8)(R_9)$, $N(R_5)_2$,

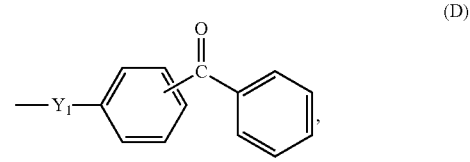

(D)

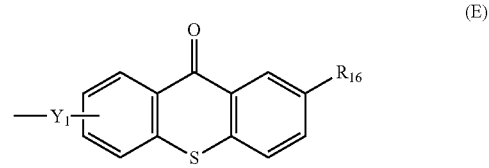

(E)

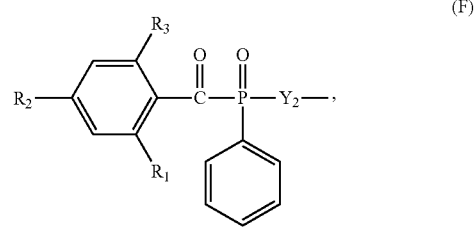

(F)

-continued

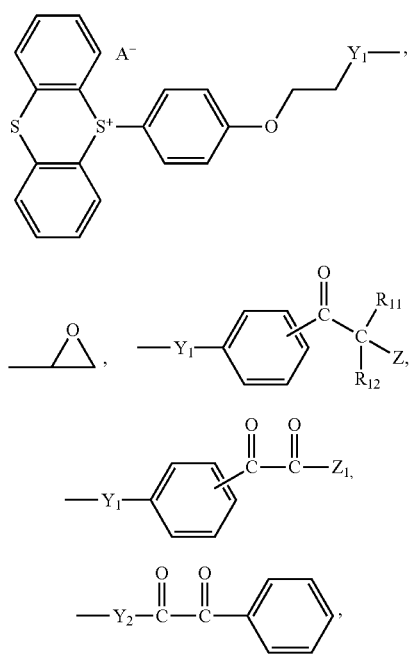

propenoyloxy, 2-methylpropenoyloxy, C3-C12cycloalkyl which is unsubstituted or substituted by C1-C4-alkyl, C1-C4alkoxy or by OH, C3-C12cycloalkyl which is interrupted by one or more O, $NR_5$ or S and which interrupted C3-C12cycloalkyl is unsubstituted or substituted by C1-C4alkyl, C1-C4-alkoxy or by OH, and C6-C14 aryl which is unsubstituted or substituted by C1-C4alkyl, C1-C4alkoxy or by OH; or $R_4$, is C6-C10 aryl which is unsubstituted or substituted by one or more C1-C12 alkyl, C2-C20 alkyl which is interrupted by one or more O, C1-C12-alkoxy or by OH; or $R_4$ if X is $NR_5$, together with $R_5$ and the N-atom forms a 5 or 6-membered saturated ring which is uninterrupted or interrupted by O or $NR_5$ and which uninterrupted or interrupted ring is unsubstituted or substituted by one or more C1-C4alkyl, C1-C4alkoxy or by OH;

A is $PF_6$, $SbF_6$, $AsF_6$ or $B(C_6F_5)_4$;

$R_5$ is hydrogen, $(CO)R_6$, phenyl, C1-C12alkyl, C2-C12alkyl which is interrupted by one or more O, wherein said C1-C12 alkyl or interrupted C2-C12alkyl is unsubstituted or substituted by one or more C3-C7cycloalkyl, OH or by NCO, C3-C12 cycloalkyl which is unsubstituted or substituted by one or more C1-C4 alkyl, C1-C4 alkoxy, OH or by NCO;

$R_6$ is C1-C12 alkyl, C2-C12 alkyl which is interrupted by one or more O, wherein said C1-C12 alkyl or interrupted C2-C12 alkyl is unsubstituted or substituted by one or more C3-C7-cycloalkyl, OH, NCO or by phenyl which is substituted by NCO;

or $R_6$ is C3-C12 cycloalkyl, C2-C10 alkenyl which is unsubstituted or substituted by one or more C1-C4alkyl, OH or C1-C4 alkoxy;

or $R_6$ is C6-C14 aryl which is unsubstituted or substituted by C1-C12 alkyl, C1-C12 alkoxy, NCO or by NCO-substituted C1-C12 alkyl;

or $R_5$ and $R_6$ together with the N-atom form a 5 or 6-membered saturated ring which is uninterrupted or interrupted by O or $NR_5$ and which uninterrupted or interrupted ring is unsubstituted or substituted by one or more C1-C4alkyl, C1-C4alkoxy or by OH;

$R_7$, $R_8$ and $R_9$ independently of each other are C1-C4alkyl, C6-C14aryl or C1-C4 alkoxy;

o is 0-10;

$Y_1$ is a bond, O, S, NRs, O(CO)—* or O(CO)—$CH_2$—O—*, wherein the asterix denotes the bond to the phenyl ring of the group (A), (B), (D), or (E);

$Y_2$ is a bond, O, S or NRs;

$R_{11}$ and $R_{12}$ independently of each other are C1-C10 alkyl, C2-C10 alkenyl or phenyl-C1-C4-alkyl which is unsubstituted or substituted by C1-C4 alkyl, or R11 and R12 together with the C-atom to which they are attached are cyclohexyl or cyclopentyl;

Z is OH or $NR_{13}R_{14}$;

$Z_1$ is C1-C12 alkoxy or C2-C12 alkoxy which is interrupted by one or more O, wherein said C1-C12 alkoxy or interrupted C2-C12 alkoxy is unsubstituted or substituted by OH;

$R_{13}$ and $R_{14}$ independently of each other are C1-C12 alkyl, C1-C12 alkyl which is substituted by one or more OH or halogen; or $R_{13}$ and $R_{14}$ together with the N-atom to which they are attached form a 5- or 6-membered unsaturated or saturated ring, which ring is uninterrupted or interrupted by O or $NR_{15}$;

$R_{15}$ is C1-C4 alkyl;

$R_{16}$ is hydrogen or C1-C4 alkyl;

provided that (i) if $R_1$, $R_2$ and $R_3$ as C1-C4 alkyl are $CH_3$ and X is O, then $R_4$ as C1-C28 alkyl is not methyl, ethyl, n-propyl, 2-propyl, n-butyl, 1-methyl-prop-1-yl, tert-butyl, n-hexyl;

(ii) if $R_1$ and $R_3$ as halogen are Cl, $R_2$ is hydrogen and X is O, then $R_4$ as substituted C3-C10 aryl is not 4-butyl-phenyl;

(iii) if $R_1$ and $R_3$ as C1-C4alkoxy are methoxy, $R_2$ is hydrogen and X is NRs, and $R_4$ together with $R_5$ and the N-atom forms a 5 or 6-membered saturated ring, then said ring is not piperid-1-yl;

Formula (II)

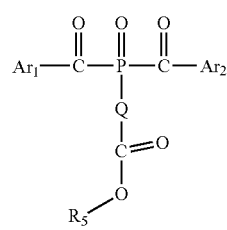

wherein $Ar_1$ and $Ar_2$ independently of each other are

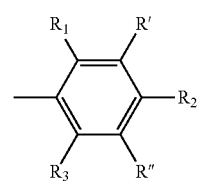

or naphthyl which is unsubstituted or substituted one or more times by $R_1$, $R_2$, $R_3$ or R';

$R_1$ and $R_3$ independently of each other are C1-C4 alkyl, C1-C4 alkoxy or halogen; $R_2$ is hydrogen, C1-C4 alkyl, halogen, C1-C4 alkoxy or C2-C20 alkoxy which is interrupted by one or more O;

Q is C1-C4 alkylene;

$R_4$ is methyl or ethyl;

R' and R" independently of each other are hydrogen or PG-Y—R'''—X—;

PG is a polymerizable group or methyl or ethyl;

Y is a direct single bond, O or S;

X is a direct single bond, O or S; R''' is a direct single bond, C1-C20alkylene or C2-C20 alkylene which is interrupted by one or more O;

$R_5$ is C3-C30alkyl which is unsubstituted or substituted by one or more of the groups selected from OH and

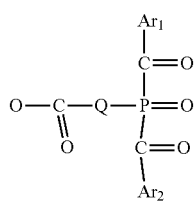

or $R_5$ is C2-C28 alkyl which is interrupted by one or more O or C3-C8 cycloalkylene and which interrupted C3-C28 alkyl is unsubstituted or substituted by one or more of the groups selected from OH and

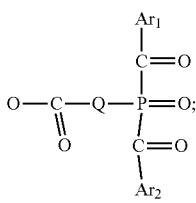

and optionally a compound of formula $R_5$—OH, wherein $R_5$ is as defined above;

Formula (III)

Formula (III)

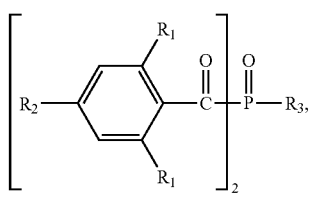

wherein $R_1$ is C1-C4alkyl, C1-C4 alkoxy or halogen;

$R_2$ is hydrogen, C1-C4alkyl, C1-C4 alkoxy or halogen and $R_3$ is C1-C20 alkyl, cyclopentyl, cyclohexyl, phenyl-C1-C4 alkyl or a group of the following formula

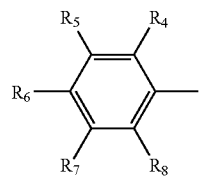

or $R_3$ is naphthyl, biphenylyl or an O-, S- or N-containing 5- or 6-membered heterocyclic ring, the naphthyl, biphenylyl and O-, S- or N-containing 5- or 6-membered heterocyclic ring radicals being unsubstituted or substituted by C1-C4 alkyl, C1-C4 alkoxy, halogen, C1-C4 alkylthio;

$R_4$, $R_5$, $R_6$, $R_7$ and $R_8$ are each independently of the others hydrogen, halogen, C1-C20 alkyl, cyclopentyl, cyclohexyl, C2-C12 alkenyl, C2-C20 alkyl interrupted by one or more non-consecutive O atoms, phenyl-C1-C4 alkyl, C1-C20 alkoxy, or phenyl that is unsubstituted or substituted by one or two C1-C4 alkyl or/and C1-C4 alkoxy substituents; and Formula (IV)

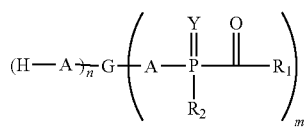

wherein each A represents independently of one another O, S, $NR_3$;

G is a residue of the multifunctional compound (core) $G\text{-}(A\text{-}H)_{m+n}$, wherein each A-H represents an alcoholic or amino or thiol group;

m and n are both integer numbers and m+n is comprised between 3 and 10;

n is comprised between 3 and 8;

$R_1$, $R_2$ are independently of one another, a radical selected from C1-C18alkyl, C6-C12aryl and C5-C12cycloalkyl, each of which is uninterrupted or interrupted by one or more oxygen and/or sulfur atoms and/or one or more substituted or unsubstituted imino groups, or are a five- to six-membered heterocyclic radical containing oxygen and/or nitrogen and/or sulfur atoms; where each of said radicals may be substituted by aryl, alkyl, aryloxy, alkoxy, heteroatoms and/or heterocyclic radicals;

$R_2$ may also be $R_1$—(C=O)—;

Y is O or S;

$R_3$ is hydrogen or C1-C4alkyl;

with the proviso that the photoinitiators of formula (IV) do not contain photocurable ethylenically unsaturated groups.

4. The combination of claim 1, wherein said at least one ketocoumarin is selected from Formulas (V) to (VII):

Formula (V)

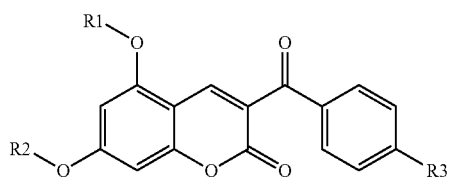

wherein

R₁ and R₂ are, each independently, a C1-C4 alkyl group

R₃ is selected from:
- a branched C6-C20 alkyl group or a mixture of linear and branched C6-C20 alkyl groups;
- a C6-C20 alkyl-aryl, an aryl C6-C20 alkyl, a C6-C20 alkyl-heteroaryl, a heteroaryl-C6-C20 alkylene oxide, a —COO-C6-C20 alkyl and a COOaryl;

Formula (VI)

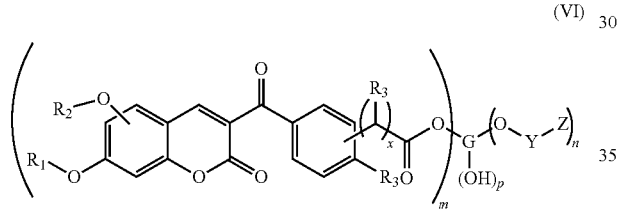

G is a residue of an optionally alkoxylated polyhydroxy compound;

m, n and p are numbers and m+n+p has a value ranging from 2 to 10;

p has a value ranging from 0 to 8;

x is an interger number with a value ranging from 0 to 10, and when x is 0, the phenyl group is directly linked to the carbonyl group;

Y represents, each independently a direct single bond or a substituted or unsubstituted divalent linking group comprising 1 to 14 carbon atoms;

Z represents a radically polymerizable functional group;

R₃ represents, each independently hydrogen, alkyl C1-C12, substituted or unsubstituted phenyl, aryl or heteroaryl, cycloalkyl C5-C6, alkyl C1-C12 which is substituted with —SH, —N(alkyl C1-C6)₂, piperidino, morpholino, piperazino, —OH, —O(alkyl C1-C12), —COOH; or C1-C12 alkoxy;

R₁, R₂ are, each independently, hydrogen, alkyl C1-C12, substituted or unsubstituted phenyl, substituted or unsubstituted aryl, substituted or unsubstituted heteroaryl, cycloalkyl C5-C6, alkyl C1-C12 which is substituted with —SH, —N(alkyl C1-C6)₂, piperidino, morpholino, piperazino, —OH, —O(alkyl C1-C12), COOH; or C1-C12alkoxy; and Formula (VII)

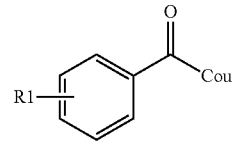

wherein R₁ is hydrogen or a substituted or unsubstituted C1-C12 alkyl group;

Cou is a coumarin group of Formula (a):

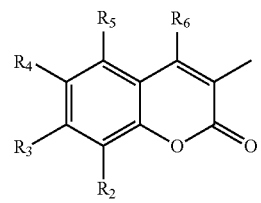

wherein

R₂, R₃, R₄ and R₅ are, independently of one another, hydrogen; or —S—R7, where R7 is hydrogen, C1-C12alkyl, C2-C12alkenyl, substituted or unsubstituted phenyl, aryl or heteroaryl, C5-C6cycloalkyl, C1-C12alkyl which is substituted with SH, —N(C1-C6 alkyl)₂, piperidino, morpholino, piperazino, —OH, —O(C1-C12alkyl), —COOH; or C1-C12alkoxy; and at least one of R₂, R₃, R₄ and R₅ is different from H;

R₆ is hydrogen, a hydroxyl group or an alkyl group having from 1 to 4 carbon atoms;

or Cou is a substituted or unsubstituted naphtha-coumarin group of formula:

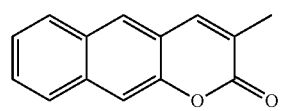

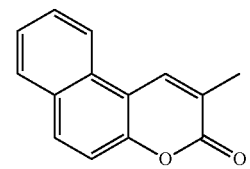

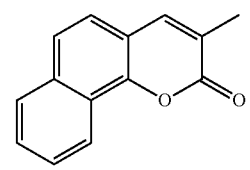

provided that at least one of R₂, R₃, R₄ and R₅ is different from H and that, when Cou is (a) and at least one of R₂, R₃, R₄ and R₅ is C1-C12 alkoxy or when Cou is (b), (c) or (d), R₁ is a substituted or unsubstituted C1-C12 alkyl group.

5. A photocurable composition comprising at least one combination according to claim 1, at least one ethylenically unsaturated compound and, optionally, one or more additives.

6. The photocurable composition according to claim 5 characterized in that the at least one ethylenically unsaturated compound is selected from alkyl or hydroxyalkyl (metha)acrylates, oligomeric polyinsatured compounds, acrylated epoxy resins, acrylated, vinyl-ether, acrylate polyurethanes and acrylated polyethers.

7. The photocurable composition according to claim 5, comprising:
(i) from 80 to 99% by weight of at least one ethylenically unsaturated compound;
(ii) from 1 to 20% by weight of a combination comprising:
a' 60 to 90% by weight, of at least one Norrish Type I photoinitiator selected from acylphosphine oxides:
b' 1 to 20% by weight, of at least one Norrish Type II photoinitiator selected from ketocoumarins;
c' 0 to 20% by weight, of at least one co-initiator.

8. A method for photocuring photopolymerizable compositions, coatings, adhesives and inks, which method comprises:
coating or printing a photopolymerizable composition according to claim 5 onto a substrate, and
photopolymerizing said coated or printed composition with a light source on said substrate or photopolimerizing at least one photocurable composition according to claim 5.

9. The combination of photoinitiators according to claim 1, comprising
70 to 85% by weight of said at least one Norrish Type I photoinitiator;
5 to 20% by weight of said at least one Norrish Type II photoinitiator; and
5 to 20% by weight of said at least one co-initiator.

10. The combination of claim 2 comprising,
a" 10 to 30% by weight of said solid photoinitiator belonging to Norrish Type I photoinitiators and 50 to 80% by weight of a liquid photoinitiator belonging to Norrish Type I photoinitiators selected from acylphosphine oxides; and
b" 10 to 15%-by weight, of said at least one photoinitiator belonging to Norrish Type II photoinitiators selected from ketocoumarins.

* * * * *